US006031909A

United States Patent [19]

Daoud

[11] Patent Number: 6,031,909

[45] Date of Patent: Feb. 29, 2000

[54] MODULAR JACK HOUSING

[75] Inventor: Bassel Hage Daoud, Parsippany, N.J.

[73] Assignee: Lucent Technologies Inc., Murray Hill, N.J.

[21] Appl. No.: 09/045,066

[22] Filed: Mar. 19, 1998

[51] Int. Cl.[7] .............................. H04M 1/00; H01R 23/02

[52] U.S. Cl. .............................................. 379/438; 439/676

[58] Field of Search .............................. 379/438; 439/676, 439/669, 927

[56] References Cited

U.S. PATENT DOCUMENTS 4,537,459 8/1985 Brennan et al. ......................... 439/927

*Primary Examiner*—Jack Chiang

[57] ABSTRACT

A size reduced modular jack housing comprising a body with at least two sides, a back, a top and a front surface; a modular plug body receiving space formed in the back surface and having a top region substantially proximate to the top surface for receiving a modular body plug latch; the body having a notch formed through the front surface and extending towards the back surface; wherein an upper boundary of the notch is defined by a bottom surface of an integrated mounting latch for mounting the housing on a mounting surface; and wherein a lower boundary of the notch is defined by a portion of the housing that is between said top region of the receiving space and the geometric center of the housing.

24 Claims, 7 Drawing Sheets

MODULAR JACK HOUSING

FIELD OF THE INVENTION

This invention is directed to a modular jack housing, and in particular, to a modular jack housing for use with equipment attached to a telephone line or data network line, such as through an RJ11- or RJ45-type modular plug.

BACKGROUND OF THE INVENTION

Modular jack housings are well known in the art. Most residential and commercial buildings contain typical RJ11-type jack housings for connecting a telephone or other similar device to a telephone line.

In a residential setting, telephone lines are installed throughout the home and are terminated at the wall surface in a line plug which is installed in a modular jack housing. At the wall surface, the modular jack housing is installed in a wall plate, generally mounted to a box. The modular jack housing is configured to receive a line plug, generally a type 645 line plug. Most telephone connection cords sold today comprise a multi-conductor wire with a plug at each end, such as an RJ11 plug. One plug is inserted in the telephone, answering machine or other device, and the other plug is inserted in the modular jack housing at the wall. The user simply plugs a line into the modular jack housing in order to make an electrical connection with the terminated telephone line.

In a commercial setting, telephone lines are installed throughout the building and terminated at a central location, such as a building entrance protector, junction box or cross-connect field. A typical building entrance protector may be 27 inches tall, with a fixed number of openings for receiving and mounting a number of modular jack housings on a mounting surface which is attached to or within the junction box. In a typical commercial building, there may be hundreds of modular jack housings to be installed. Accordingly, numerous junction boxes are installed to accommodate the many modular jack housings, thus occupying a significant amount of space.

Referring to FIG. 1, the prior art jack housing 1 comprises a space for receiving an installed multiconductor 645-type telephone line plug 34, a plug receiving space 13, a fixed tab 22, and a latch 15. When the user inserts the plug 12 into the jack housing receiving space 13, an electrical connection is established between the leads 50 of the modular plug 12 and the spring leads 30 of the installed line plug 34. The plug 12 comprises a movable plug latch stem 14. The jack housing 1 contains a corresponding plug latch receiving space 36 to accept the movable plug latch stem 14. The plug latch also has plug latch retaining tabs 26 for maintaining the modular plug 12 within the jack housing receiving space 13. The latch stem 14 is movable so that the user can move the stem out of engagement with housing and remove the plug 12 from the jack housing receiving space 13 and thereby terminate the electrical connection. The industry standard RJ11 plug latch stem 14 is formed at the opposite side of the plug body 12 from the leads 50. The same general configuration applies to RJ45-type plugs and jack housings.

A typical means for mounting a jack housing 1 in a mounting surface 24 comprises a fixed tab 22 at the bottom end of the housing 1 and a latch 15 with a latch tab 18 at the top end of the housing 1. The user inserts the jack housing 1 into an opening of a mounting surface 24 and engages the fixed tab 22. The jack housing 1 is wider than the opening in the mounting surface 24 to maintain the jack housing 1 within the mounting surface 24 by abutment of the width against one side of the mounting surface. The user then tilts the jack housing 1 forward and the latch tab 18 bends downward towards a jack housing body top surface 38 as it passes within the opening, until the latch tab 18 passes the front edge of the mounting surface 24, whereupon the latch tab 18 snaps back upward, for abutment with the other side of the mounting surface. The jack housing 1 is then mounted to the mounting surface 24.

Because it is necessary to bend the latch 15 to install and remove the jack housing 1 in a mounting surface 24, a space is needed between the jack housing body top surface 38 and the bottom of the latch tab 15. In the prior art jack housing, this bending space was provided at a point above where the plug 12 was inserted into the jack housing receiving space 13. That is, the jack housing body top surface 38 is above the plug latch receiving space 36. Therefore, the typical jack housing body 1 has a wall, generally depicted as 40, extending vertically between the plug latch receiving space 36 and the bottom of the latch 15. Wall 40 is essentially wasted space which makes the jack housing larger than necessary, as is the space below the 645 line plug.

In other prior art embodiments (not shown) the mounting features are located on the side of the housing where the plug receiving space is located, to facilitate flush mounting. These embodiments suffer from the same shortcomings as discussed above, with wasted space above the plug receiving space and below the line plug.

Because the number of phone lines required to service customer demand is increasing daily as a result of multiple computer networks, modems, facsimile machines and the like, and since only a fixed number of modular jack housings can fit into a junction box, the size of the jack housings becomes a limiting factor as more and more phone lines need to be installed.

The present invention is directed at overcoming the shortcomings in the prior art.

SUMMARY OF THE INVENTION

Generally speaking, in accordance the instant invention, a modular jack housing includes an integrated mounting latch feature configured such that the overall dimension of the modular jack housing is decreased.

In a preferred embodiment, the modular jack housing includes a modular plug body receiving space, and an integrated mounting latch formed by a notch through the front surface of the modular jack housing, wherein a lower boundary of the notch is defined by a portion of the housing that is between the top of the plug latch receiving space and a portion of the housing body proximate the upper front edge of an inserted modular plug. When so constructed, such a modular jack housing in accordance with the present invention is significantly size reduced, allowing for greater line densities to be obtained in existing boxes and panels, or for reducing the size of such enclosures.

Additionally, in another embodiment, the housing is configured such that the notch is formed in the region below the 645-type line plug, to facilitate flush mounting of the housing while also significantly reducing the housing size.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DESCRIPTION OF A PREFERRED EMBODIMENT

Figure 2:
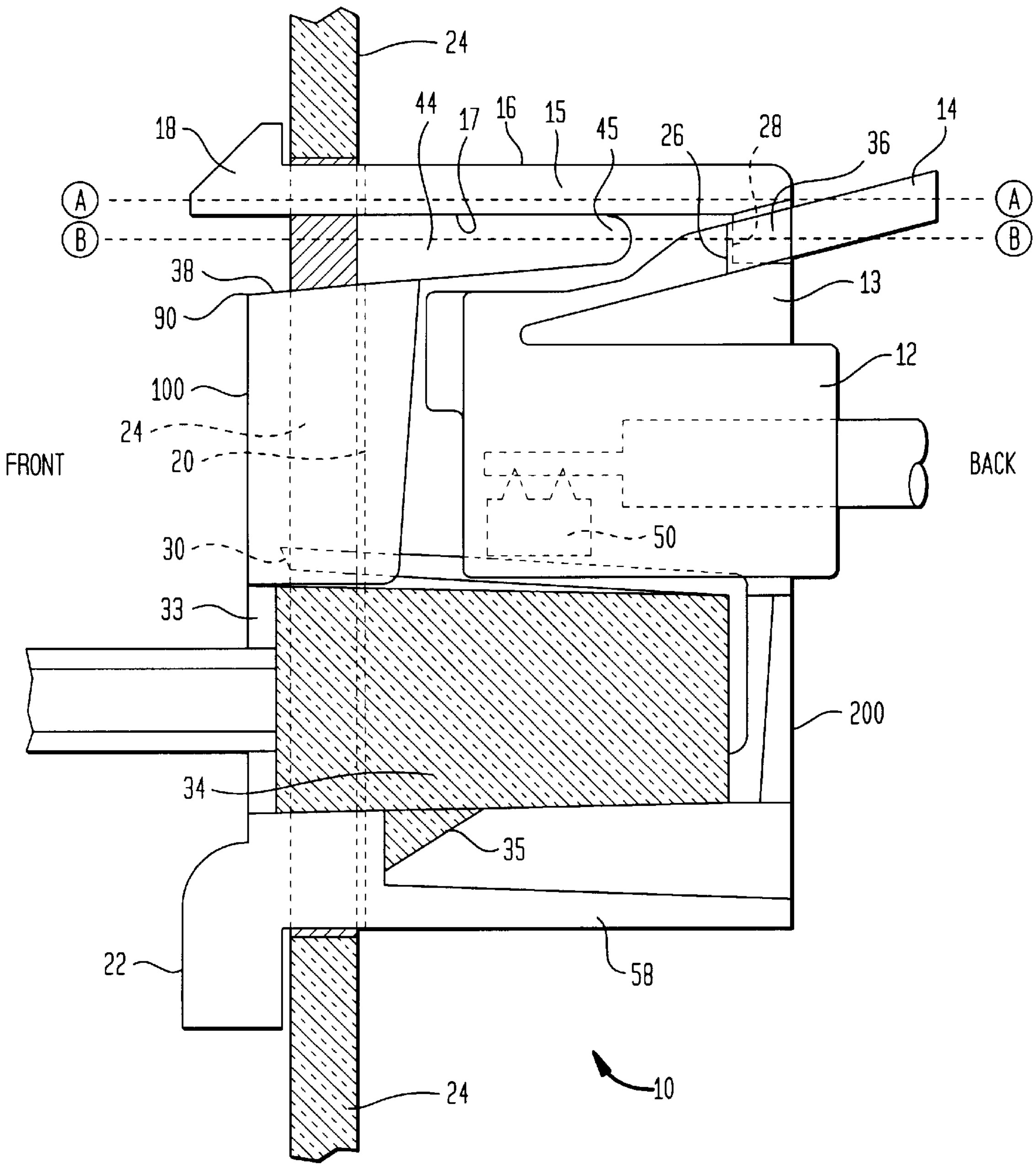
FIG. 2 is a side elevational cutaway view of a modular jack housing mounted on a mounting surface and constructed in accordance with a preferred embodiment of the present invention, and having inserted therein a modular plug.
Figure 4:
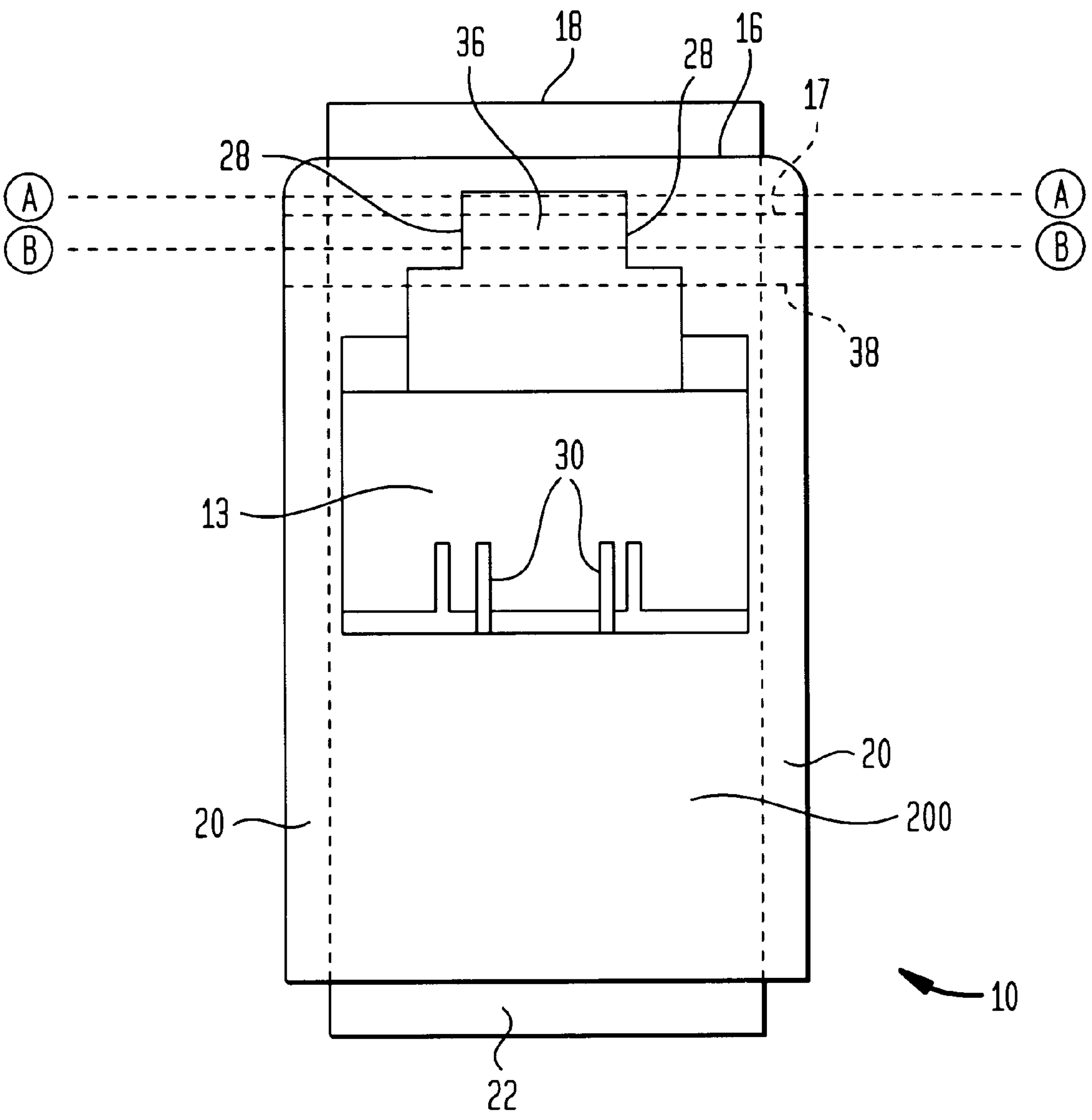
FIG. 4 is a rear elevational view of a modular jack housing constructed in accordance with a preferred embodiment of the present invention, with no plug inserted.

Reference is first made to FIGS. 2 and 4, which depict a modular jack housing according to a preferred embodiment of the present invention. The modular jack housing generally includes a housing body 10, a generally longitudinally extending plug body receiving space 13, a plug latch retaining wall 28, a fixed tab 22, side walls 20, and a housing body top surface 38 and a housing bottom surface 58. Also included is a generally longitudinally extending line plug receiving space 33 for receiving an art-recognized line plug 34, such as, by way of non-limiting example, a 645 type line plug. The modular jack housing also includes an integrated, resilient mounting latch 15, including a top surface 16, a bottom surface 17, and a mounting latch tab 18. Jack housing 10 may be formed of a variety of art-recognized materials, generally plastics, depending on the particular application to which the housing is applied.

Jack housing 10 may be, for example, of a type for generally receiving an RJ11 type plug, but it should be recognized that the invention is equally applicable to RJ45 type housings, as well as other art-recognized modular plug receiving housings, all for use in connecting telephone related equipment and/or data network equipment to a related telephone or network line. The various industry standard line plugs and modular plugs which may be inserted into the jack housing 10 form no part of the present invention.

Figure 3:
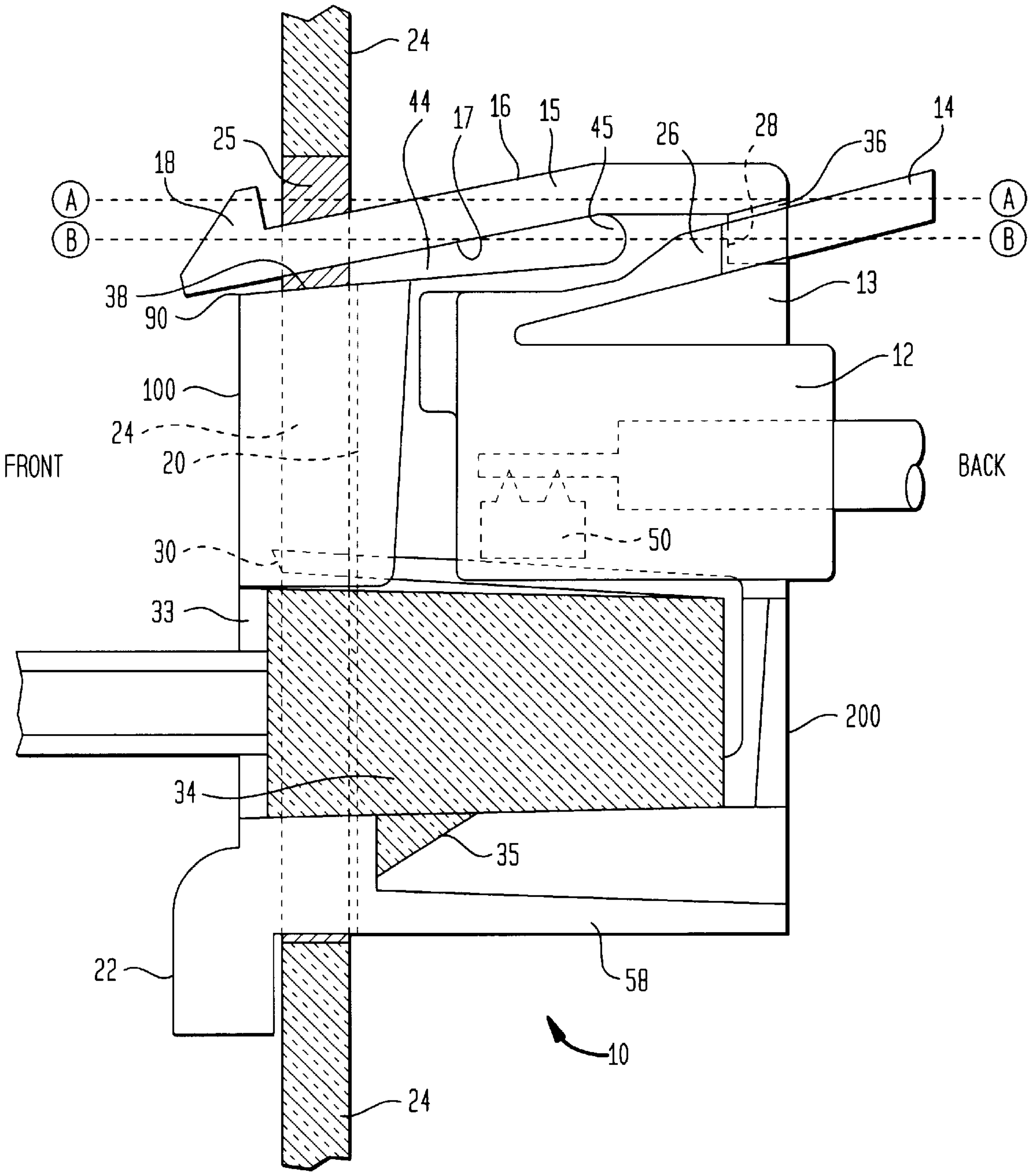
FIG. 3 is a side elevation cutaway view of the modular jack housing of FIG. 2 during installation on a mounting surface.

Because it is necessary to bend the integrated mounting latch 15 to install in and/or remove the housing body 10 from a mounting surface 24, a space is needed between the housing body top surface 38 and the latch bottom surface 17 to accommodate this bending movement. Referring to FIGS. 2 and 3, in a preferred embodiment, a notch 44 is formed in the housing body 10 through a front surface 100 and side surfaces (not numbered) and extending towards a back surface 200. The upper boundary of the notch 44 is defined by the integrated mounting latch bottom surface 17. The lower boundary of the notch 44 is defined by a modular jack housing body top surface 38. As can be seen from FIGS. 2 and 3, the lower boundary of the notch, i.e., the housing body top surface 38, slopingly extends from a point proximate the plug latch receiving space 36 to an upper edge 90 of the front surface 100. The closed end 45 of the notch 44 is placed as close to plug receiving space 36 as is practical, considering the necessity to provide sufficient material to accommodate the resilience necessary to permit movement of the latch 15 and structural strength to prevent deformation or breaking.

Mounting surface 24 may be, by way of non-limiting example, a surface within or on an art-recognized building entrance protector, customer bridge, cross connect field, or wall mounting plate. Such surfaces are generally sheet metal or plastic depending on the application requirements. Of course, the person of skill will recognized that a jack housing in accordance with the instant invention may be mounted in any appropriately sized opening, as application requirements dictate.

Figure 5:
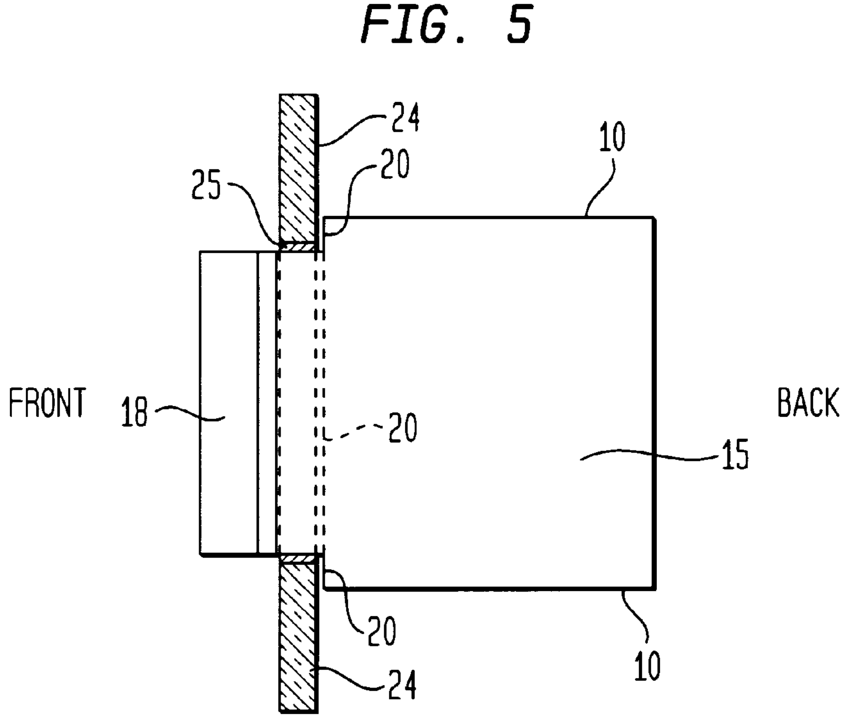
FIG. 5 is a top plan view of a modular jack housing constructed in accordance with a preferred embodiment of the present invention.
Figure 6:
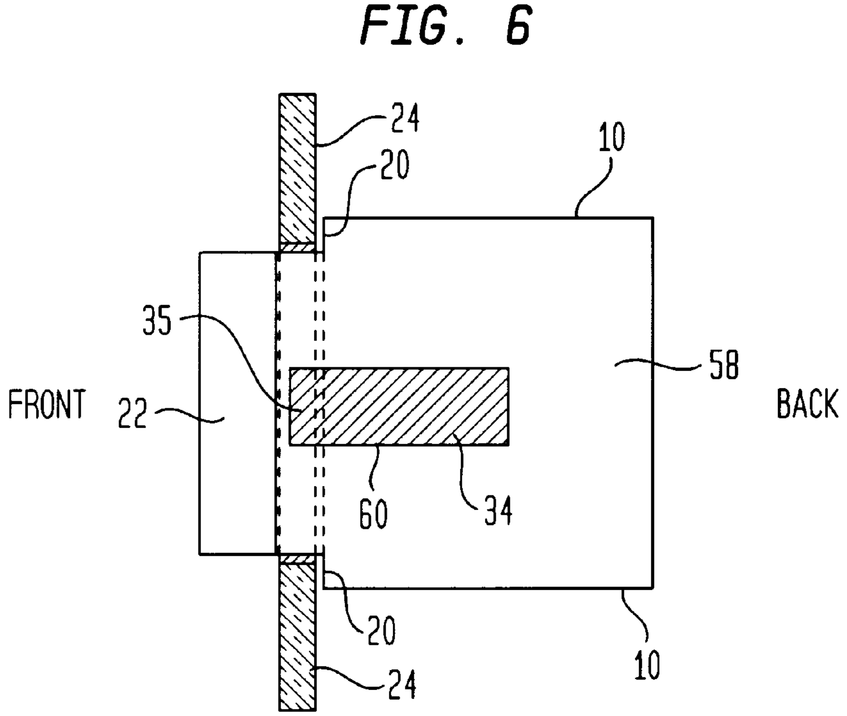
FIG. 6 is a bottom plan view of a modular jack housing constructed in accordance with a preferred embodiment of the present invention.

In accordance with the instant invention, and as can best be seen by FIG. 3, the user inserts the housing body 10 into an opening 25 of the mounting surface 24 and engages the fixed tab 22. As seen in FIGS. 5 and 6, the side walls 20 of the housing body 10 are wider than the opening 25 in the mounting surface 24 to maintain the housing body 10 within the mounting surface 24 when installed.

With further reference to FIG. 3, during insertion into the mounting surface 24, the integrated resilient mounting latch 15 is moved downward towards the housing body top surface 38 until the integrated mounting latch tab 18 passes through the opening 25 in the mounting surface 24, whereupon integrated housing latch tab 18 resiliently springs back upward, resulting in a snap fit of housing body 10 within the opening 25 in mounting surface 24.

Referring to FIGS. 2 and 4, a conventional plug body 12, for example an RJ11 type plug, may be inserted from the back side 200 of the housing body 10 longitudinally into the plug body receiving space 13. In a known manner, as the plug body 12 is inserted in the plug body receiving space 13, the plug latch stem 14 is bent downwards towards plug body 12. When the plug body 12 is fully inserted in the plug body receiving space 13, the plug latch stem 14 springs back upward, whereby the plug latch retaining tab 26 engages the plug latch retaining wall 28 in a conventional manner. Plug latch retaining wall 28 maintains the plug body 12 within the plug body receiving space 13 until such time as a user pushes down on plug latch stem 14 in order to disengage the plug latch retaining tab 26 from the plug latch retaining wall 28 and permit removal of plug 12 from housing 10.

As can best be seen in FIG. 4, housing body 10 comprises a plug latch stem receiving space 36 for accepting the plug latch stem 14 when the plug body 12 is fully inserted in plug body receiving space 13. Referring once again to FIG. 2, an imaginary plane "A" is shown such that imaginary plane "A" intersects the plug latch stem receiving space 36 at its uppermost point, i.e., the point closest to the integrated housing latch top surface 16, and extends substantially parallel to the longitudinal extent of plug receiving space 13 and to integrated housing latch top surface 16. Referring to FIG. 3, when a user mounts the housing body 10 on a mounting surface 24, the integrated housing latch 15 bends downward towards the housing body top surface 38 such that the integrated housing latch top surface 16 intersects imaginary plane "A".

Referring again to FIG. 2, an imaginary plane "B" is shown extending substantially parallel to the longitudinal extent of plug receiving space 13 and intersecting the plug latch retaining wall 28. Plane "B" may also extend through notch 44 between the integrated housing latch bottom surface 17 and the housing body top surface 38, substantially parallel to the integrated housing latch bottom surface 17. Referring to FIG. 3, when a user mounts the housing body 10 on a mounting surface 24, the integrated housing latch 15 bends downward towards the housing body top surface 38 such that the integrated housing latch bottom surface 17 intersects imaginary plane "B".

Figure 1:
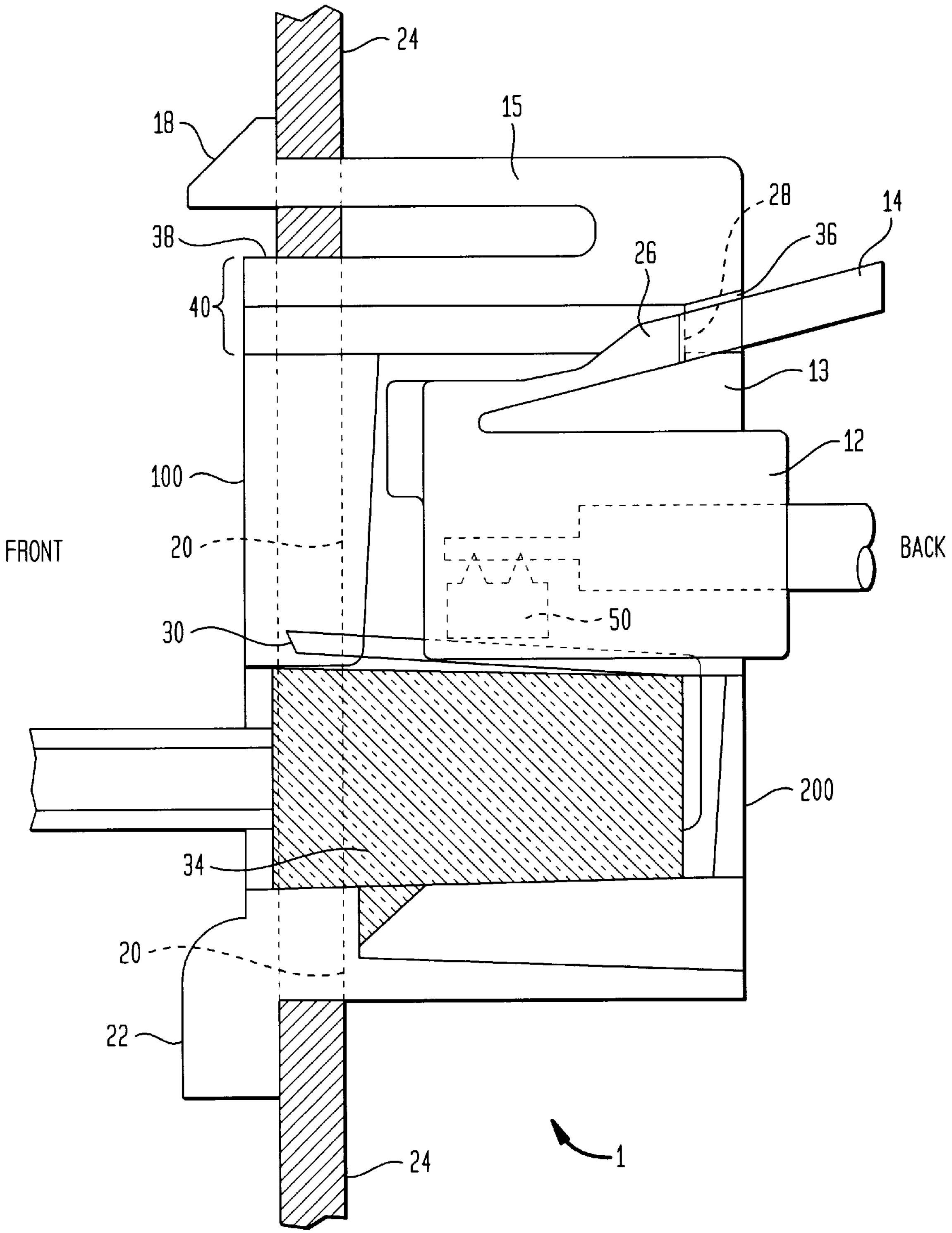
FIG. 1 (PRIOR ART)
FIG. 1 is a side elevational cutaway view of a prior art modular jack housing.

When so constructed, housing body 10 is significantly size reduced, as the unutilized space previously filled by the prior art blank wall 40 (FIG. 1) becomes the location where notch 44 is formed, thus permitting mounting tab 15 to be located closer to plug receiving space 13, constructively utilizing what has previously been dead space and reducing the overall size of housing 10 over the prior art housings. In an actual application wherein multiple RJ11 type jack housings were installed in a box mounted customer bridge application, a reduction of approximately one quarter inch per jack housing was achieved, resulting in a box height reduction from the 27 inches required to house the prior art jack housings to 12 inches to house the inventive jack housing disclosed herein, while increasing the wire trough space between rows of jack housings.

Of course, one skilled in the art will recognize many variations in the particular sizes and shapes of the components comprising the jack housing of the instant invention. For example, the shape and angle of orientation of the notch 44 may be varied to have parallel or non-parallel sides, and/or the surfaces 16 and/or 17 of latch 15 may or may not be parallel, as a matter of design choice. Also, the thickness of mounting latch 15 may be varied, as may be the height of latch tab 18, as requirements dictate. Likewise, the closed end 45 of notch 44 may variably positioned in relation to plug latch 14, as requirements dictate. Likewise, notch 44 may be may be formed in a number of ways without departing from the spirit of the invention. For example, notch 44 may be may be formed through front surface 100 extending towards the back surface 200 but not through the side surfaces. So constructed, the integrated mounting latch 15 would be bendable by providing slits through the integrated mounting latch 15 from the front towards the back. Such slits in connection with notch 44 would provide the flexibility to allow the integrated mounting latch 15 to bend.

Moreover, bottom wall 58 may be moved as close to the bottom of line plug receiving space 33 as practical. For example, and as seen in FIG. 6, bottom wall 58 may be configured with an aperture 60 for receiving line plug latch tab 35, thus enabling bottom wall 58 to be only as thick as necessary to provide structural strength and retention of line plug 34 via latch 35.

Figure 7:
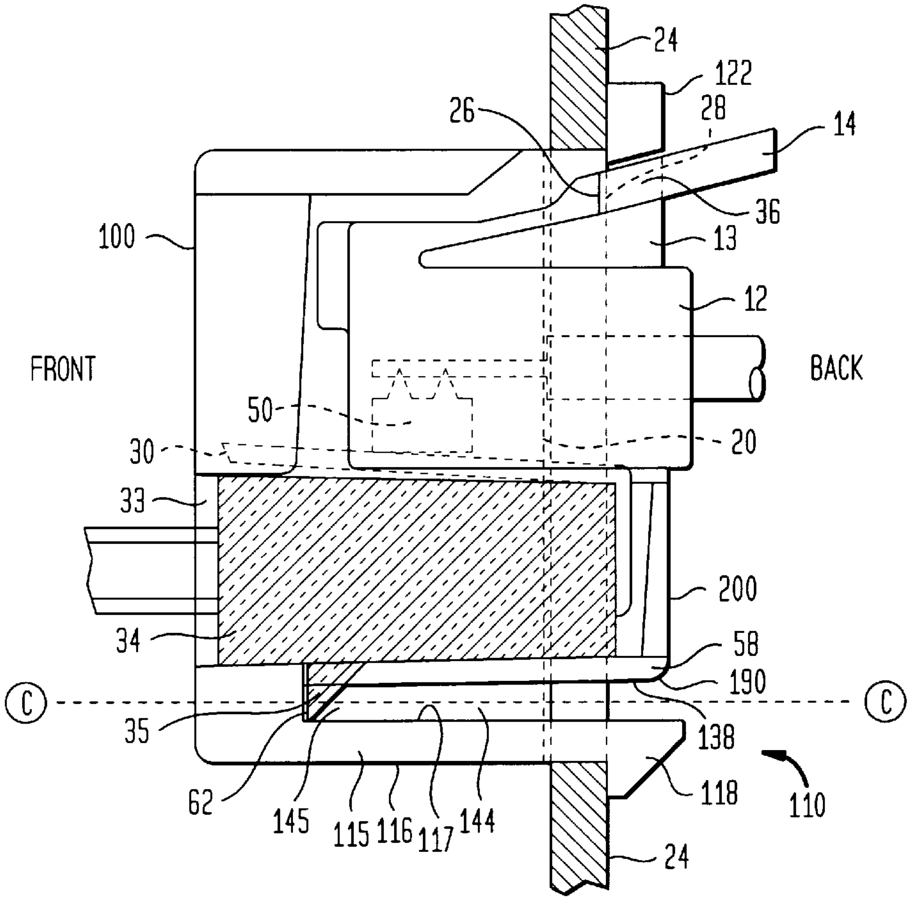
FIG. 7 is a side cutaway view of an alternate embodiment of the present invention.
Figure 8:
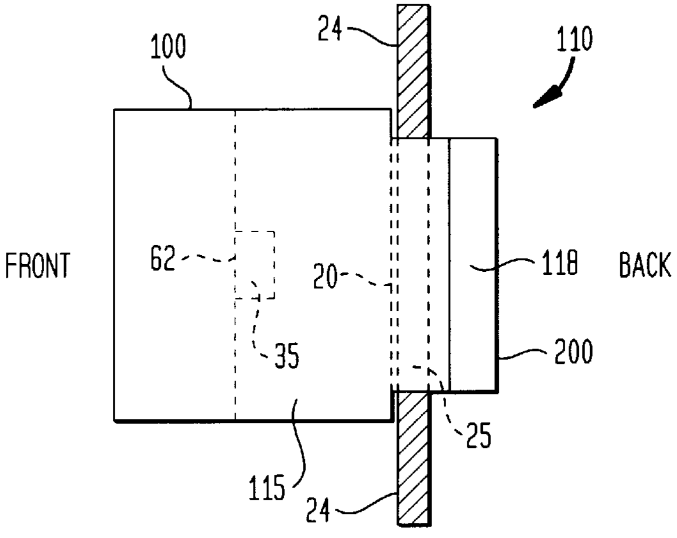
FIG. 8 is a bottom view of the alternate embodiment of FIG. 7.

In an alternate embodiment, as seen in FIGS. 7 and 8, the modular jack housing generally includes a housing body 110, a generally longitudinally extending line plug receiving space 33 for receiving an art-recognized line plug 34, such as, by way of non-limiting example, a 645 type line plug, a line plug latch retaining wall 62, a fixed tab 122, side walls 20, and a housing body bottom surface 138 and a housing bottom wall 58. The modular jack housing also includes an integrated, resilient mounting latch 115, including a top surface 117, a bottom surface 116, and a mounting latch tab 118. Jack housing 110 may be formed of a variety of art-recognized materials, generally plastics, depending on the particular application to which the housing is applied.

Because it is necessary to bend the integrated mounting latch 115 to install in and/or remove the housing body 110 from a mounting surface 24, a space is needed between the housing body bottom surface 138 and the latch top surface 117 to accommodate this bending movement. In this alternative embodiment, notch 144 is formed in the housing body 110 through a back surface 200 and extending towards a front surface 100. The lower boundary of the notch 144 is defined by the integrated mounting latch top surface 117. The upper boundary of the notch 144 is defined by a modular jack housing body bottom surface 138. As can be seen from FIG. 7, line plug latch 35 may extend into notch 144 up to a point where the lowermost point of line plug latch 35 comes into contact with integrated mounting latch top surface 117. The upper boundary of the notch, i.e., the housing body bottom surface 138, slopingly extends from a point proximate the line plug latch 35 to a lower edge 190 of the back surface 200. The closed end 145 of the notch 144 is defined by line plug latch retaining wall 62.

As seen in FIGS. 7 and 8, and in accordance with this alternate embodiment, the user inserts the housing body 110 into an opening 25 of the mounting surface 24 and engages the fixed tab 122. Side walls 20 of the housing body 110 are wider than the opening in the mounting surface 24 to maintain the housing body 110 within the mounting surface 24 when installed.

During insertion into the mounting surface 24, the integrated resilient mounting latch 115 is moved upward towards the housing body bottom surface 138 until the integrated mounting latch tab 118 passes through the opening 25 in the mounting surface 24, whereupon integrated housing latch tab 118 resiliently springs back downward, resulting in a snap fit of housing body 110 within the opening 25 in mounting surface 24.

A conventional plug body 12, for example an RJ11 type plug, may be inserted from the back side 200 of the housing body 110 longitudinally into the plug body receiving space 13. A line plug 34 may be inserted from the front side 100 of the housing body 110 longitudinally into the line plug receiving space 33. When the line plug 34 is fully inserted in the line plug receiving space 33, the line plug retaining tab 35 engages the line plug retaining wall 62 in a conventional manner. Line plug retaining wall 62 maintains the line plug 34 within the line plug receiving space 33.

Referring once again to FIG. 7, an imaginary plane "C" is shown extending substantially parallel to the longitudinal extent of line plug receiving space 33 and intersecting the line plug latch retaining wall 62. Plane "C" may also extend through notch 144 between the integrated housing latch top surface 117 and the housing body bottom surface 138, substantially parallel to the integrated housing latch top surface 117. When a user mounts the housing body 110 on a mounting surface 24, the integrated housing latch 115 bends upward towards the housing body bottom surface 138 such that the integrated housing latch top surface 117 intersects imaginary plane "C".

When so constructed, housing body 110 is significantly size reduced, as the unutilized dead space behind line plug latch 35 of the prior art becomes the location where notch 144 is formed, thus permitting mounting tab 115 to be located closer to line plug receiving space 33, constructively utilizing what has previously been dead space and reducing the overall size of housing 110 over the prior art housings.

Of course, one skilled in the art will recognize many variations in the particular sizes and shapes of the components comprising the jack housing of the instant invention. For example, the shape and angle of orientation of the notch 144 may be varied to have parallel or non-parallel sides, and/or the surfaces 116 and/or 117 of latch 115 may or may not be parallel, as a matter of design choice; line plug latch 35 may or may not extend all the way to the integrated mounting latch top surface 117, or may extend further into the integrated mounting latch 115. Also, the thickness of mounting latch 115 may be varied, as may be the height of latch tab 118, as requirements dictate. Likewise, the closed end 145 of notch 144 may variably positioned in relation to line plug latch 35, as requirements dictate. Likewise, notch 144 may be may be formed in a number of ways without departing from the spirit of the invention. For example, notch 144 may be may be formed through front surface 100 extending towards the back surface 200 but not through the side surfaces. So constructed, the integrated mounting latch 115 would be bendable by providing slits through the integrated mounting latch 115 from the front towards the back. Such slits in connection with notch 144 would provide the flexibility to allow the integrated mounting latch 115 to bend.

Figure 9:
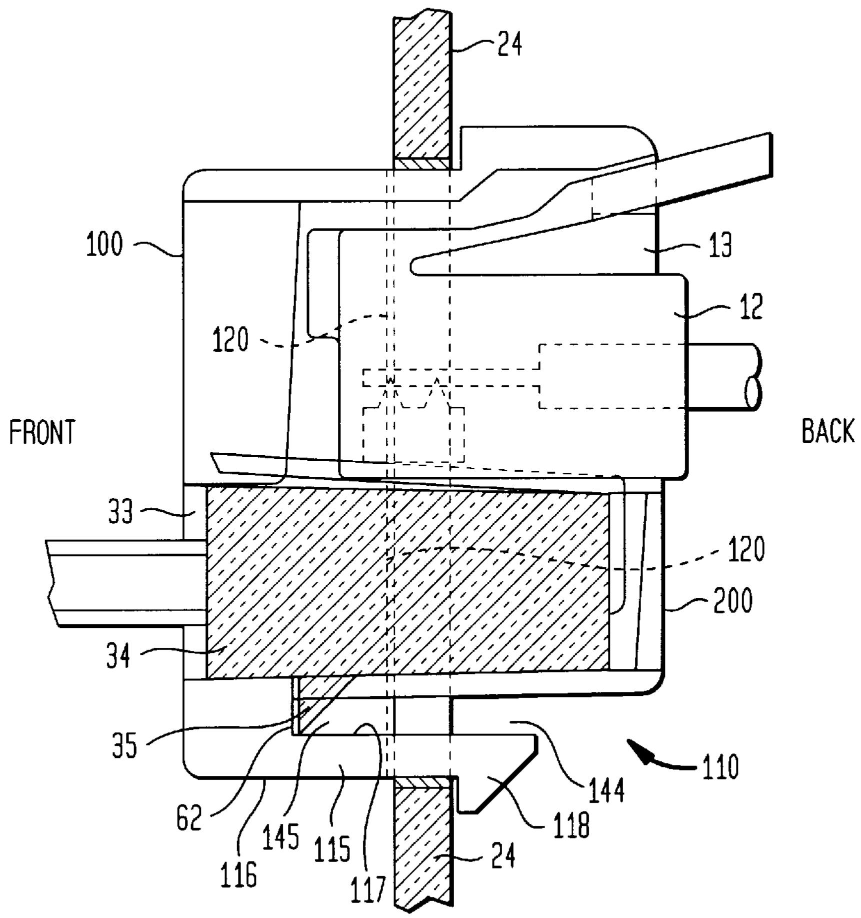
FIG. 9 is a side cutaway view of an alternate embodiment of the present invention.
Figure 10:
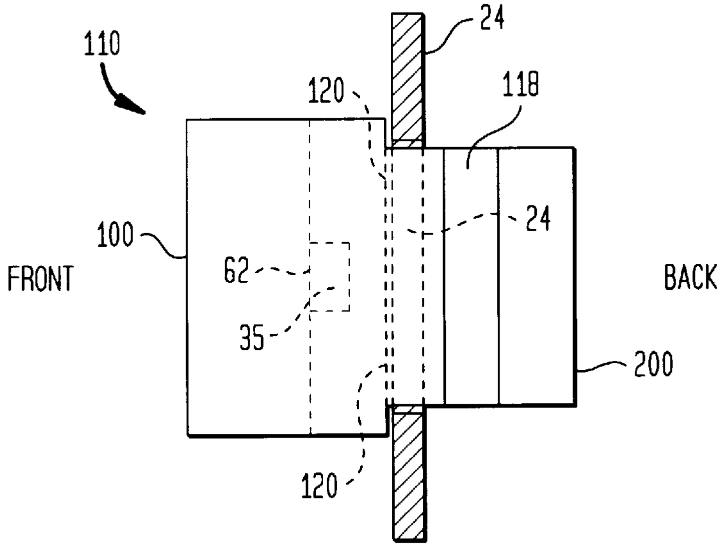
FIG. 10 is a bottom view of the alternate embodiment of FIG. 9.

In another alternate embodiment, as seen in FIG. 9, the modular jack housing generally includes a housing body 110, a generally longitudinally extending line plug receiving space 33 for receiving an art-recognized line plug 34, such as, by way of non-limiting example, a 645 type line plug, a line plug latch retaining wall 62, a fixed tab 122, side walls 120, and a housing body bottom surface 138 and a housing bottom wall 58. The modular jack housing also includes an integrated, resilient mounting latch 115, including a top surface 117, a bottom surface 116, and a mounting latch tab 118.

Notch 144 is formed in the housing body 110 through a back surface 200 and extending towards a front surface 100. The lower boundary of the notch 144 is defined by the integrated mounting latch top surface 117. The upper boundary of the notch 144 is defined by a modular jack housing body bottom surface 138. As can be seen from FIG. 9, line plug latch 35 may extend into notch 144 up to a point where the lowermost point of line plug latch 35 comes into contact with integrated mounting latch top surface 117. The upper boundary of the notch, i.e., the housing body bottom surface 138, slopingly extends from a point proximate the line plug latch 35 to a lower edge 190 of the back surface 200. The closed end 145 of the notch 144 is defined by line plug latch retaining wall 62.

As seen in FIG. 9, and in accordance with this alternate embodiment, side walls 120 are positioned further towards the front of housing body 110, allowing the housing body 110 to extend further back through the mounting surface. That is, the user inserts the housing body 110 into an opening 25 of the mounting surface 24 and engages the fixed tab 122. Side walls 120 of the housing body 110 are wider than the opening in the mounting surface 24 to maintain the housing body 110 within the mounting surface 24 when installed.

Additionally, further economies of size, manufacture and/or construction may be achieved for all contemplated embodiments by leaving certain wall surfaces of the plug receiving space and/or line plug receiving space open so as to be in fluid communication with the mounting latch or the notch or the space outside the housing at large.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A size reduced modular jack housing comprising:

a longitudinally extending modular plug body receiving space having therein a plug latch retaining wall;

a housing body having an upper surface; and an integrated mounting latch oriented above said upper surface of said housing and having a top and bottom surface for mounting said housing in an opening through a mounting surface, said mounting latch being moveable between an insertion position wherein said bottom surface is moved toward said upper surface of said housing, and an inserted position wherein said bottom surface is moved away from said upper surface of said housing, said housing being so shaped and sized that when in said insertion position said bottom surface of said latch intersects a plane which intersects said plug latch retaining wall and extends in a direction substantially parallel to said longitudinal orientation of said plug body receiving space.

2. The modular jack housing as claimed in claim 1, wherein said mounting latch is bendable such that said top surface of said mounting latch intersects said plane when in said insertion position.

3. The modular jack housing as claimed in claim 1, wherein said modular plug receiving space is in fluid communication with said mounting latch.

4. The modular jack housing as claimed in claim 1, wherein said housing body has side walls which are so dimensioned as to prevent the passage of said housing through said opening.

5. A modular jack housing comprising:

a housing body having a top surface;

an integrated mounting latch having a top and bottom surface for mounting said housing in an opening through a mounting surface; and a modular plug body receiving space comprising a modular plug body retaining wall for maintaining a plug body within said housing when said plug body is mounted in said housing;

wherein an imaginary plane intersects said retaining wall member substantially proximate to the geometric center of said retaining wall member and extends between said housing body top surface and said bottom surface of said mounting latch substantially parallel to said mounting latch bottom surface; and wherein said mounting latch is bendable such that said bottom surface of said mounting latch intersects said plane upon mounting said housing.

6. The modular jack housing as claimed in claim 5, wherein said mounting latch is bendable such that said top surface of said mounting latch intersects said plane upon mounting said housing.

7. The modular jack housing as claimed in claim 5, wherein said modular plug receiving space is in fluid communication with said mounting latch.

8. The modular jack housing as claimed in claim 5, wherein said housing body has side walls which are so dimensioned as to prevent the passage of said housing through said opening.

9. A modular jack housing comprising:

a body with at least two sides, a back, a top and a front surface;

a modular plug body receiving space formed in said back surface and having a plug latch receiving space substantially proximate said top surface for receiving a modular body plug latch; and said body having a notch formed through said front surface and extending towards said back surface;

wherein an upper boundary of said notch is defined by a bottom surface of an integrated mounting latch for mounting said housing in an opening through a mounting surface; and wherein a lower boundary of said notch is defined by a portion of said housing that is between said plug latch receiving space and the geometric center of said housing.

10. The modular jack housing as claimed in claim 9, wherein said notch is formed through one or more of said side surfaces.

11. The modular jack housing as claimed in claim 9, wherein said modular plug receiving space is in fluid communication with said notch.

12. The modular jack housing as claimed in claim 9, wherein said housing body has side walls which are so dimensioned as to prevent the passage of said housing through said opening.

13. A size reduced modular jack housing comprising:

a longitudinally extending line plug receiving space having therein a line plug latch retaining wall;

a housing body having an lower surface; and an integrated mounting latch oriented below said lower surface of said housing and having a top and bottom surface for mounting said housing in an opening through a mounting surface, said mounting latch being moveable between an insertion position wherein said top surface is moved toward said lower surface of said housing, and an inserted position wherein said top surface is moved away from said lower surface of said housing, said housing being so shaped and sized that when in said insertion position said top surface of said latch intersects a plane which intersects said line plug latch retaining wall and extends in a direction substantially parallel to said longitudinal orientation of said line plug receiving space.

14. The modular jack housing as claimed in claim 13, wherein said mounting latch is bendable such that said bottom surface of said mounting latch intersects said plane when in said insertion position.

15. The modular jack housing as claimed in claim 13, wherein said line plug receiving space is in fluid communication with said mounting latch.

16. The modular jack housing as claimed in claim 13, wherein said housing body has side walls which are so dimensioned as to prevent the passage of said housing through said opening.

17. A modular jack housing comprising:

a housing body having a bottom surface;

an integrated mounting latch, having a top and bottom surface, for mounting said housing in an opening through a mounting surface; and a line plug body receiving space comprising a line plug body retaining wall for maintaining a line plug body within said housing when said line plug body is mounted in said housing;

wherein an imaginary plane intersects said retaining wall member substantially proximate to the geometric center of said retaining wall member and extends between said housing body bottom surface and said top surface of said mounting latch substantially parallel to said mounting latch top surface; and wherein said mounting latch is bendable such that said top surface of said mounting latch intersects said plane upon mounting said housing.

18. The modular jack housing as claimed in claim 17, wherein said mounting latch is bendable such that said bottom surface of said mounting latch intersects said plane upon mounting said housing.

19. The modular jack housing as claimed in claim 17, wherein said line plug receiving space is in fluid communication with said mounting latch.

20. The modular jack housing as claimed in claim 17, wherein said housing body has side walls which are so dimensioned as to prevent the passage of said housing through said opening.

21. A modular jack housing comprising:

a body with at least two sides, a back, a bottom and a front surface;

a line plug body receiving space formed in said front surface and having a line plug latch receiving space substantially proximate said bottom surface for receiving a line plug latch; and said body having a notch formed through said back surface and extending towards said front surface;

wherein a lower boundary of said notch is defined by a top surface of an rated mounting latch for mounting said housing in an opening through a mounting surface; and wherein an upper boundary of said notch is defined by a portion of said housing that is between said line plug latch receiving space and the geometric center of said housing.

22. The modular jack housing as claimed in claim 21, wherein said notch is formed through one or more of said side surfaces.

23. The modular jack housing as claimed in claim 21, wherein said line plug receiving space is in fluid communication with said notch.

24. The modular jack housing as claimed in claim 21, wherein said housing body has side walls which are so dimensioned as to prevent the passage of said housing through said opening.

* * * * *